US008618771B2

(12) United States Patent
Ichikawa

(10) Patent No.: US 8,618,771 B2
(45) Date of Patent: Dec. 31, 2013

(54) ELECTRIC POWERED VEHICLE, VEHICLE CHARGE DEVICE AND VEHICLE CHARGE SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 610 days.

(21) Appl. No.: 12/448,546

(22) PCT Filed: Feb. 15, 2008

(86) PCT No.: PCT/JP2008/053010
§ 371 (c)(1),
(2), (4) Date: Jun. 25, 2009

(87) PCT Pub. No.: WO2008/102857
PCT Pub. Date: Aug. 28, 2008

(65) Prior Publication Data
US 2010/0019723 A1 Jan. 28, 2010

(30) Foreign Application Priority Data
Feb. 20, 2007 (JP) ................................. 2007-039327

(51) Int. Cl.
*H02J 7/00* (2006.01)
(52) U.S. Cl.
USPC .......................................... 320/109; 320/119
(58) Field of Classification Search
USPC ......................................... 320/138, 119, 109
See application file for complete search history.

(56) References Cited

U.S. PATENT DOCUMENTS

| 3,904,947 A | 9/1975 | Crews |
| 4,282,475 A | 8/1981 | Milton |
| 5,402,046 A | 3/1995 | Jeanneret |
| 5,596,258 A * | 1/1997 | Kimura et al. ................ 320/163 |
| 6,923,279 B2 * | 8/2005 | Shimane et al. ............. 180/65.1 |
| 6,979,977 B2 * | 12/2005 | Amano et al. ................ 320/104 |
| 2005/0151509 A1 * | 7/2005 | Cook ............................. 320/116 |

FOREIGN PATENT DOCUMENTS

| EP | 1 780 864 A1 | 5/2007 |
| JP | A-7-15807 | 1/1995 |
| JP | A-7-39012 | 2/1995 |
| JP | A-7-250405 | 9/1995 |
| JP | A-8-98324 | 4/1996 |

(Continued)

OTHER PUBLICATIONS

Russian Office Action issued in Russian Patent Application No. 2009135041/11(049349) dated Jul. 19, 2010 (with translation).

(Continued)

*Primary Examiner* — Edward Tso
*Assistant Examiner* — Robert Grant
(74) *Attorney, Agent, or Firm* — Oliff & Berridge, PLC

(57) ABSTRACT

A vehicle has a low voltage power generating unit mounted thereon, which passively generates low voltage power when the vehicle is electrically connected to commercial power supply through coupling of a connector unit. A winding transformer transforms the commercial power supply input to the primary side with a prescribed ratio of transformation, and the transformation is performed without requiring any control signal from the outside. The AC power with voltage lowered, output from the secondary side of winding transformer, is rectified by a diode unit, and a low voltage power is generated. The low voltage power generated by the diode unit is supplied through a supplementary low voltage DC line to a sub battery and to a controller.

16 Claims, 6 Drawing Sheets

(56) References Cited

FOREIGN PATENT DOCUMENTS

| | | |
|---|---|---|
| JP | A-8-107606 | 4/1996 |
| JP | A-9-65509 | 3/1997 |
| JP | A-11-178228 | 7/1999 |
| JP | A-2000-278807 | 10/2000 |
| JP | A-2002-209307 | 7/2002 |
| JP | A-2003-47161 | 2/2003 |
| JP | A-2006-50779 | 2/2006 |
| RU | 2 106 266 C1 | 3/1998 |
| RU | 2 113 366 C1 | 6/1998 |
| WO | WO 02/081255 A1 | 10/2002 |

OTHER PUBLICATIONS

Nov. 29, 2011 Supplementary European Search Report issued in European Patent Application No. 08711784.2.

* cited by examiner

ELECTRIC POWERED VEHICLE, VEHICLE CHARGE DEVICE AND VEHICLE CHARGE SYSTEM

TECHNICAL FIELD

The present invention relates to an electric powered vehicle having a rechargeable power storage unit that can be charged by an external power supply, a vehicle charge device for charging the electric powered vehicle, and a vehicle charge system including these. More specifically, the present invention relates to a scheme for ensuring electric power necessary for control operation when the power storage unit is charged.

BACKGROUND ART

Recently, in consideration of environmental issues, an electric powered vehicle such as an electric vehicle, a hybrid vehicle or a fuel cell vehicle has attracting attention. Such an electric powered vehicle has a rechargeable power storage unit mounted thereon, to supply electric power to an electric motor, and to convert kinetic energy to electric energy for storage at the time of regenerative braking.

Conventionally, a vehicle charge system for charging the power storage unit mounted on such an electric powered vehicle using an external power supply, for example, commercial power supply, has been known. For instance, Japanese Patent Laying-Open No. 08-107606 discloses a charge device for an electric powered vehicle, including charge priority control means for inhibiting running state of the electric powered vehicle even when a main switch is on, as long as a charging voltage is being supplied from a charger, and for continuing charging of a battery. By the charge device for an electric powered vehicle, charging is given priority even when the main switch is operated by mistake.

In these days, charging of a power storage unit mounted on a hybrid vehicle by an external power supply, for the purpose of improving general fuel consumption efficiency, has attracting attention.

In order to supply electric power necessary for generating vehicle driving force, a power storage unit having relatively high voltage is used as the object of charging. For efficient charging of the power storage unit having high voltage, optimization of charging current and charging voltage is desirable. Therefore, it has become a common practice to mount a power converting device on such an electric powered vehicle, for generating charging voltage and charging current that are suitable for the power storage unit, from an external power supply.

The power converting device is formed of a switching element such as a transistor. Therefore, power conversion by the power converting device requires a control signal (for example, gate voltage or base current) to cause the switching operation of the transistor. In most cases, such a control signal is generated by a controller operating with low voltage power from a low voltage power storage unit having relatively low output voltage of, for example, 12V or 24V, provided separate from the power storage unit as the object of charging.

Therefore, once the low voltage power storage unit enters the over-discharged state, that is, when the battery "goes flat" it becomes impossible to activate the controller even if external power is supplied to the electric powered vehicle. As a result, the power converting operation by the power converting device cannot be executed, and the charging by the external power supply becomes impossible.

As a solution to such a problem, it may be possible to lower the voltage of high voltage power storage unit using the voltage converting device and to supply the voltage to the low voltage power storage unit that has "gone flat." A control signal for controlling the voltage converting device, however, must also be generated by the controller that operates with the low voltage power from the low voltage power storage unit. Therefore, the problem remains unsolved.

DISCLOSURE OF THE INVENTION

The present invention was made to solve such a problem, and its object is to provide, for an electric powered vehicle having a rechargeable power storage unit that is charged by an external power supply, an electric powered vehicle, a vehicle charge device and a vehicle charge system that can secure electric power for operating a controller controlling charging by the external power supply and thereby reliably execute charging of the power storage unit by the external power supply.

According to an aspect, the present invention provides an electric powered vehicle, mounting a rechargeable first power storage unit and allowing charging of the first power storage unit by an external power supply. The electric powered vehicle in accordance with this aspect includes a connector receiving portion coupled at the time of charging to a connector unit outside of the vehicle, for receiving electric power from the external power supply; a power converting unit for converting the electric power from the external power supply, supplied by the coupling of the connector unit and the connector receiving portion and for charging the first power storage unit; a rechargeable second power storage unit having lower output voltage than the first power storage unit; a control unit operating with electric power from the second power storage unit and for controlling power converting operation of the power converting unit; and a low voltage charging unit for charging the second power storage unit independent of state of operation of the control unit, when the connector unit is coupled to the connector receiving portion.

In the electric powered vehicle in accordance with this aspect, when the connector unit is coupled for charging the mounted first power storage unit, the second power storage unit is charged independent of the state of operation of the control unit. Therefore, even if the second power storage unit is in the over-discharged state and unable to supply power at the time when the connector unit and the electric powered vehicle are coupled, the control unit can be operated by the electric power supplied from the low voltage charging unit. Therefore, the control unit causes the power converting unit to execute the power converting operation regardless of the state of charge of the second power storage unit and, therefore, the first power storage unit can reliably be charged.

Preferably, the low voltage charging unit includes a low voltage power generating unit for receiving at least part of the electric power from the external power supply and passively generating low voltage power for charging the second power storage unit.

Alternatively, or preferably, the connector receiving portion is adapted to receive low voltage power for charging the second power storage unit generated outside of the vehicle, in addition to the electric power from the external power supply; and the low voltage charging unit includes a power line for charging the second power storage unit with the low voltage power received through the connector receiving portion.

Alternatively, or preferably, the low voltage charging unit includes a voltage lowering unit for lowering output voltage of the first power storage unit and passively generating low voltage power for charging the second power storage unit, and a relay unit connected between the first power storage unit and the voltage lowering unit for electrically connecting/disconnecting these to/from each other; and the relay unit electrically connects the first power storage unit to the voltage lowering unit in response to a drive command issued when the connector unit is coupled to the connector receiving portion.

According to another aspect, the present invention provides a vehicle charge device, for an electric powered vehicle mounting a rechargeable first power storage unit, for charging the first power storage unit with an external power supply. The electric powered vehicle includes a power converting unit for converting electric power supplied from the external power supply at the time of charging, and for charging the first power storage unit, a rechargeable second power storage unit having lower output voltage than the first power storage unit, and a control unit operating with electric power from the second power storage unit and for controlling power converting operation of the power converting unit. The vehicle charge device in accordance with this aspect includes a connector unit coupled at the time of charging to the electric powered vehicle, for electrically connecting the external power supply and the electric powered vehicle, and a low voltage charging unit for charging the second power storage unit independent of state of operation of the control unit of the electric powered vehicle, when the connector unit is coupled to the electric powered vehicle.

By the vehicle charge device in accordance with this aspect, when the connector unit is coupled to the electric powered vehicle to charge the first power storage unit mounted on the electric powered vehicle, the second power storage unit is charged independent of the state of operation of the control unit. Therefore, even if the second power storage unit is in the over-discharged state and unable to supply power at the time when the connector unit and the electric powered vehicle are coupled, the control unit can be operated by the electric power supplied from the low voltage charging unit. Therefore, the control unit causes the power converting unit to execute the power converting operation regardless of the state of charge of the second power storage unit and, therefore, the first power storage unit can reliably be charged.

Preferably, the low voltage charging unit includes a low voltage power generating unit for receiving the electric power from the external power supply and passively generating low voltage power for charging the second power storage unit; and the connector unit is adapted to supply the low voltage power to the electric powered vehicle in addition to the electric power from the external power supply. The electric powered vehicle in accordance with this aspect includes a power line for charging the second power storage unit with the low voltage power supplied through the connector unit.

Alternatively, or preferably, the electric powered vehicle further includes a voltage lowering unit for lowering output voltage of the first power storage unit and passively generating low voltage power for charging the second power storage unit, and a relay unit connected between the first power storage unit and the voltage lowering unit for electrically connecting/disconnecting these to/from each other. The low voltage charging unit includes a command generating unit for applying, to the switching unit of the electric powered vehicle, a drive command causing the relay unit to electrically connect the first power storage unit to the voltage lowering unit, in response to coupling of the connector unit and the electric powered vehicle.

According to a still further aspect, the present invention provides a vehicle charge system, including: an electric powered vehicle mounting a rechargeable first power storage unit; and a vehicle charge device for charging the first power storage unit mounted on the electric powered vehicle by an external power supply. The vehicle charge device includes a connector unit coupled at the time of charging to the electric powered vehicle, for electrically connecting the external power supply and the electric powered vehicle. The electric powered vehicle includes a power converting unit for converting electric power supplied from the external power supply at the time of charging, and for charging the first power storage unit, a rechargeable second power storage unit having lower output voltage than the first power storage unit, and a control unit operating with electric power from the second power storage unit and for controlling power converting operation of the power converting unit. The vehicle charge system in accordance with this aspect includes a low voltage charging unit for charging the second power storage unit independent of state of operation of the control unit, when the connector unit is coupled to the electric powered vehicle.

In the vehicle charge system in accordance with this aspect, when the connector unit is coupled to the electric powered vehicle to charge the first power storage unit mounted on the electric powered vehicle, the second power storage unit is charged independent of the state of operation of the control unit. Therefore, even if the second power storage unit is in the over-discharged state and unable to supply power at the time when the connector unit and the electric powered vehicle are coupled, the control unit can be operated by the electric power supplied from the low voltage charging unit. Therefore, the control unit causes the power converting unit to execute the power converting operation regardless of the state of charge of the second power storage unit and, therefore, the first power storage unit can reliably be charged.

Preferably, the low voltage charging unit includes a low voltage power generating unit for receiving the electric power from the external power supply and passively generating low voltage power for charging the second power storage unit.

More preferably, the low voltage power generating unit is mounted on the electric powered vehicle and adapted to receive at least part of the electric power from the external power supply, supplied to the electric powered vehicle by the. coupling of the connector unit.

Further preferably, the low voltage power generating unit is provided in the connector unit, receives at least part of the electric power from the external power supply to be supplied to the electric powered vehicle and generates the low voltage power, and adapted such that the low voltage power is supplied through the connector unit to the second power storage unit of the electric powered vehicle.

More preferably, the low voltage charging unit includes a voltage lowering unit for lowering output voltage of the first power storage unit and passively generating low voltage power for charging the second power storage unit, and a relay unit connected between the first power storage unit and the voltage lowering unit for electrically connecting/disconnecting these to/from each other; and the relay unit electrically connects the first power storage unit and the voltage lowering unit when the connector unit is coupled to the electric powered vehicle.

More preferably, the low voltage charging unit further includes a command generating unit for generating a drive command causing the relay unit to electrically connect the first power storage unit to the voltage lowering unit, in response to coupling of the connector unit and the electric powered vehicle, and the command generating unit is provided at the connector unit and operates receiving the electric power from the external power supply.

According to the present invention, when an electric powered vehicle mounting a rechargeable power storage unit is charged by an external power supply, the electric power for operating a controller controlling charging by the external power supply is secured and, therefore, charging of the power storage unit by the external power supply can reliably be executed.

BEST MODES FOR CARRYING OUT THE INVENTION

Figure 1:
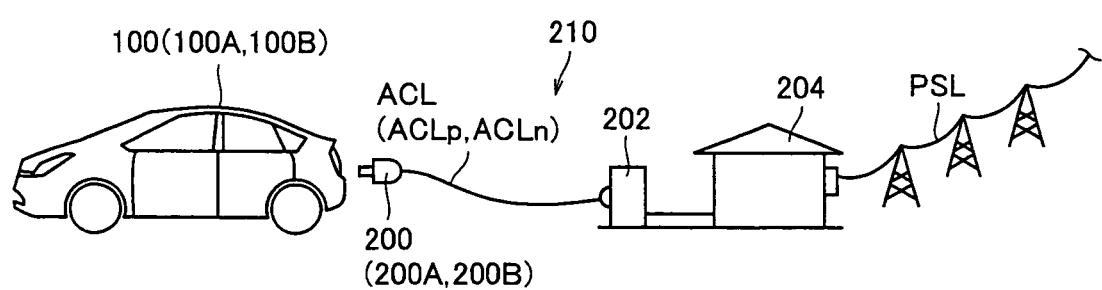
FIG. 1 shows an overall configuration of the vehicle charge system in accordance with Embodiment 1 of the present invention.

Embodiments of the present invention will be described in detail with reference to the figures. In the figures, the same or corresponding portions are denoted by the same reference characters and description thereof will not be repeated.

[Embodiment 1]

Referring to FIG. 1, a vehicle charge system 1 in accordance with Embodiment 1 of the present invention includes an electric powered vehicle 100 and a vehicle charge device 210.

Electric powered vehicle 100 generally refers to a vehicle having an electric motor as a source of driving force and a power storage unit for supplying electric power to the electric motor mounted thereon, and it includes at least an electric vehicle, a hybrid vehicle and a fuel cell vehicle. In the present embodiment, a hybrid vehicle having an electric motor and an engine mounted thereon and running with driving forces from the motor and the engine adjusted to an optimal ratio will be described as electric. powered vehicle (hereinafter simply referred to as a "vehicle") 100.

Vehicle charge device 210 is for charging a power storage unit mounted on vehicle 100 by a commercial power supply as an example of external power supply, and it includes a connector unit 200 and a charging station 202. Connector unit 200 is connected to charging station 202 through a power line ACL formed, for example, of a cabtyre cable. Charging station 202 takes out commercial power supplied to a house 204 through an external power supply line PSL, and supplies power to connector unit 200. At the time of charging, connector unit 200 is coupled to vehicle 100, and electrically connects commercial power supply as the external power supply to vehicle 100. Vehicle 100 has a connector receiving portion (not shown), which is coupled to connector unit 200 for receiving commercial power supply.

The external power supply supplied through connector unit 200 to vehicle 100 may be electric power generated by a solar battery panel installed on a roof of house 204.

A housing mechanism for connector unit 200, or a mechanism for winding power line ACL connected to connector unit 200 (both not shown) may be added to charging station 202.

Further, an accounting mechanism or a security mechanism for the user may be added to charging station 202.

Figure 2:
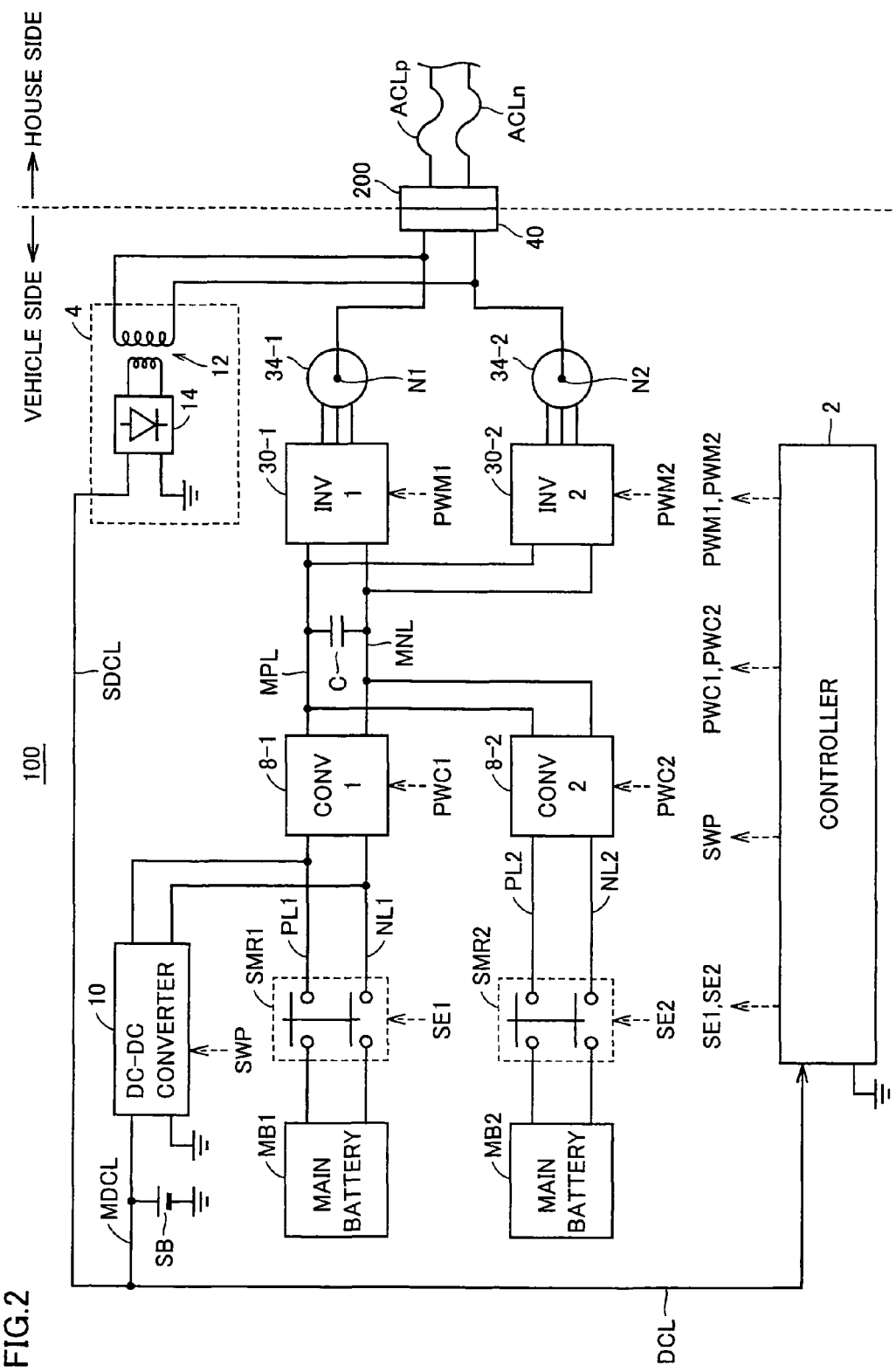
FIG. 2 is a schematic diagram showing a substantial portion of the vehicle charge system in accordance with Embodiment 1 of the present invention.

FIG. 2 is a schematic diagram showing a substantial portion of the vehicle charge system in accordance with Embodiment 1. Referring to FIG. 2, vehicle 100 includes main batteries MB1 and MB2, a first converter (CONV1) 8-1, a second converter (CONV2) 8-2, a first inverter (INV1) 30-1, a second inverter (INV2) 30-2, a first motor generator (MG1) 34-1, a second motor generator (MG2) 34-2, a sub battery SB, a DC-DC converter 10, and a controller 2.

Main batteries MB1 and MB2 are rechargeable DC power storage elements, which exchange electric power to/from motor generators 34-1 and 34-2, for generating driving force of vehicle 100 at the time of running. By way of example, main batteries MB1 and MB2 are implemented by nickel hydride batteries. Alternatively, other secondary battery such as lithium ion battery, or an electric double layer capacitor may be used. Each of the main batteries MB1 and MB2 is formed by series-connecting a number of battery cells to have relatively high rated output voltage of 300V to 500V, for example, to enable supply of relatively large power causing motor generators 34-1 and 34-2 to generate driving force.

The number of main batteries mounted on vehicle 100 may be determined in consideration of required running performance of vehicle 100, and it is may be one, or three or more, and not limited to two.

Main battery MB1 is electrically connected to the first converter 8-1 through a positive line PL1 and a negative line NL1. Main battery MB2 is electrically connected to the second converter 8-2 through a positive line PL2 and a negative line NL2. To positive line PL1 and negative line NL1 and positive line PL2 and negative line NL2, system relays SMR1 and SMR2 are inserted, respectively.

System relays SMR1 and SMR2 electrically connect or disconnect main batteries MB1 and MB2 to/from converters 8-1 and 8-2, in response to system enable signals SE1 and SE2 from controller 2, respectively. More specifically, when system enable signals SE1 and SE2 are applied from controller 2, system relays SMR1 and SMR2 are rendered conductive.

Converters 8-1 and 8-2 are voltage converting units arranged between corresponding main batteries MB1 and MB2 and a main positive power line MPL and a main negative power line MNL, for performing voltage converting operations, respectively. Specifically, converters 8-1 and 8-2 are connected in parallel to main positive line MPL and main negative line MNL, and control amount of power exchange between main batteries MB1 and MB2 and main positive power line MPL and main negative power line MNL, respectively.

More specifically, converters 8-1 and 8-2 are capable of boosting discharged power (output power) from main batteries MB1 and MB2 and supplying the result to main positive line MPL and main negative line MNL, respectively, and capable of lowering regenerative power supplied from main positive line MPL and main negative line MNL and supplying the result to main batteries MB1 and MB2, respectively. This is to make higher the voltage to be supplied to motor generators 34-1 and 34-2 for enlarging operable range (range of rotational speed) of motor generators 34-1 and 34-2.

As an example, converters 8-1 and 8-2 are formed of a "chopper" type voltage boosting/lowering circuit capable of both voltage boosting operation and voltage lowering operation through switching (circuit opening/closing) operation of the switching element. Such a voltage converting operation is controlled by switching commands PWC1 and PWC2, respectively, from controller 2, which will be described later.

Between main positive line MPL and main negative line MNL, a smoothing capacitor C is connected, by which fluctuation component included in the electric power exchanged through main positive line MPL and main negative line MNL is reduced.

To the other end of main positive line MPL and main negative line MNL, inverters 30-1 and 30-2 are electrically connected in parallel. Inverters 30-1 and 30-2 are electrically connected to motor generators 34-1 and 34-2, respectively, and perform power conversion between main positive line MPL and main negative line MNL. Each of inverters 30-1 and 30-2 is formed of a bridge circuit including three-phase arms, and power converting operations thereof are respectively controlled by switching commands PWM1 and PWM2 from controller 2, which will be described later.

Specifically, when vehicle 100 is running, inverters 30-1 and 30-2 exchange electric power to/from motor generators 34-1 and 34-2 in accordance with the state of running or operation by the driver. At the time of charging vehicle 100, inverters 30-1 and 30-2 operate in a coordinated manner to convert commercial power supply (single-phase AC) supplied through motor generators 34-1 and 34-2 to DC power, and supply the power to main batteries MB1 and MB2 through main positive line MPL and main negative line MNL (charging of main batteries MB1 and MB2).

Motor generators 34-1 and 34-2 are rotating electric machines that can bi-directionally convert electric power and rotational driving force, and the rotational driving force generated by motor generators 34-1 and 34-2 is transmitted via a driving force distributing mechanism and a driving shaft, to a driving shaft (all not shown). Specifically, motor generators 34-1 and 34-2 are each capable of generating rotational driving force from AC power supplied from inverters 30-1 and 30-2, respectively, and capable of generating electric power (capable of electric generation) from rotational driving force received from the engine (not shown) or at the time of regenerative braking of vehicle 100.

By way of example, motor generators 34-1 and 34-2 are three-phase AC synchronous rotating electric machines having a rotor with embedded permanent magnet. Further, stators of motor generators 34-1 and 34-2 each include a Y- (star-) connected three-phase stator coils. The stator coil of each phase is electrically connected to the corresponding phase of inverters 30-1 and 30-2, respectively. Further, neutral points N1 and N2 of stator coils are electrically connected to a positive supply line ACLp and a negative supply line ACLn forming power line ACL, respectively, when connector unit 200 is coupled to vehicle 100.

DC-DC converter 10 is connected to positive line PL1 and negative line NL1 in parallel with converter 8-1, lowers part of the electric power exchanged through positive line PL1 and negative line NL1 to generate low voltage power, and outputs the low voltage power (positive electrode) to a low voltage DC main line MDCL. The negative electrode side of the output terminal of DC-DC converter 10 is connected to vehicle body (ground). Here, "low voltage power" means a voltage lower than the output voltage of main batteries MB1 and MB2 and, by way of example, the voltage value is set to 12V (or 24V).

For instance, DC-DC converter 10 is implemented by a so-called "transformer type" voltage converting circuit that first converts DC power to AC power, of which voltage is converted by using a winding transformer, and the voltage-converted AC power is again converted to DC power. The voltage converting operation as such is controlled by a switching command SWP from controller 2, as will be described later.

Sub battery SB is a rechargeable DC power storage element connected between the low voltage DC main line MDCL and the vehicle body ground. Sub battery SB is charged by the low voltage power from DC-DC converter 10 supplied through low voltage DC main line MDCL, and before the start of low voltage power supply from DC-DC converter 10 (for example, at the time of system activation of vehicle 100), it supplies low voltage power to controller 2. Sub battery SB is, by way of example, a lead storage battery, of which rated output voltage is set to be about 12V. When the rated output voltage of sub battery SB is set to be 12V, the output voltage of DC-DC converter 10 may be set to about 14V, so that sub battery SB can be float-charged.

Controller 2 is a control unit generally in charge of the control operation of vehicle 100 and, by way of example, it is formed using, as a main body, a micro-computer including a CPU (Central Processing Unit), and a storage such as an ROM (Read Only Memory) and an RAM (Random Access Memory). Controller 2 operates with low voltage power supplied through low voltage DC line DCL connected to low voltage DC main line MDCL.

Specifically, when an ignition on command (not shown) is applied by an operation by the driver, controller 2 generates system enable signals SE1 and SE2, and electrically connects main batteries MB1 and MB2 to converters 8-1 and 8-2, and applies switching commands PWC1 and PWC2 to converters 8-1 and 8-2, to charge main positive line MPL and main negative line MNL to prescribed voltages. At this time, controller 2 applies switching command SWP to DC-DC converter 10, to start supply of low voltage power. In this manner, the system of vehicle 100 is activated. After system activation, controller 2 applies switching commands PWM1 and PWM2 to inverters 30-1 and 30-2, to generate necessary driving force in accordance with the driver's operation.

When the system of vehicle 100 is stopped and connector unit 200 is coupled to vehicle 100, controller 2 starts an operation for charging main batteries MB1 and MB2. Specifically, controller 2 applies system enable signals SE1 and SE2, so that main batteries MB1 and MB2 are electrically connected to converters 8-1 and 8-2. Then, controller 2 applies switching commands PWM1 and PWM2 to inverters 30-1 and 30-2, and applies switching commands PWC1 and PWC2 to converters converters 8-1 and 8-2.

As described above, controller 2 is for overall control both of system activation of vehicle 100 and charging operation of main batteries MB1 and MB2.

Next, the charging operation of main batteries MB1 and MB2 will be described.

Figure 3:
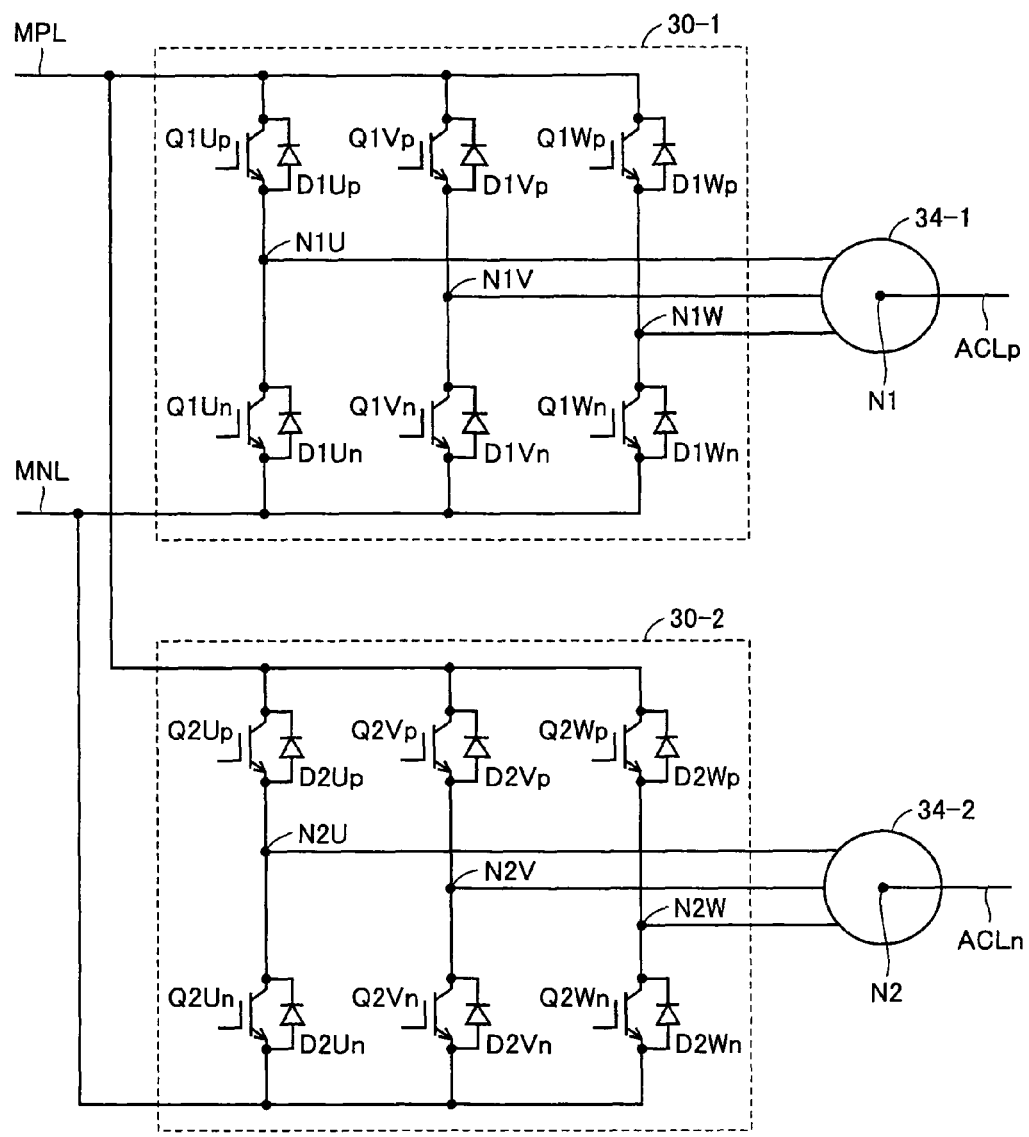
FIG. 3 is a schematic diagram of the inverter and motor generator.

FIG. 3 schematically shows configurations of inverters 30-1 and 30-2 and motor generators 34-1 and 34-2. Referring to FIG. 3, inverter 30-1 includes transistors Q1Up and Q1Un, transistors Q1Vp and Q1Vn, and transistors Q1Wp and Q1Wn, forming U-, V- and W-phase arm circuits, respectively, and each arm circuit is connected between a main positive line MPL and a main negative line MNL. Connection nodes N1U, N1V and N1W of transistors in respective arm circuits are connected to the corresponding stator coils of motor generator 34-1, and corresponding phase voltages are supplied to motor generator 34-1. By way of example, transistors Q1Up, Q1Un, Q1Vp, Q1Vn, Q1Wp, and Q1Wn are formed of switching elements such as IGBTs (Insulated Gate Bipolar Transistors).

Further, inverter 30-1 includes diodes D1Up, D1Un, D1Vp, D1Vn, D1Wp, and DIWn, and each of the diodes is connected in parallel with the corresponding transistor such that it can cause a feedback current to flow from the emitter side to the collector side of the transistor having the same reference character.

In inverter 30-1, by switching operations of respective transistors in response to switching command PWM1, power converting operation between DC power and AC power is provided. More specifically, the transistors Q1Up, Q1Vp and Q1Wp on the upper arm side (positive side) connected to main positive line MPL and the transistors Q1Un, Q1Vn and Q1Wn of the lower arm side (negative side) connected to main negative line MNL are selected, one from the upper arm side and one from the lower arm side successively, and the selected two transistors are driven to the ON state. Two transistors forming one same arm circuit are not selected simultaneously.

There are six different combinations of the transistors selected in this manner. Further, by adjusting the period (duty ratio) and phase (timing) of conducting each transistor, the amount of power-conversion and the direction of power conversion (DC power to AC power or AC power to DC power) can be controlled.

Similar to inverter 30-1, inverter 30-2 includes transistors Q2Up and Q2Un, transistors Q2Vp and Q2Vn, and transistors Q2Wp and Q2Wn forming U-, V- and W-phase arm circuits, respectively. Connection nodes N2U, N2V and N2W of transistors in respective arm circuits are connected to the corresponding stator coils of motor generator 34-2, and corresponding phase voltages are supplied to motor generator 34-2. Further, inverter 30-2 includes diodes D2Up, D2Un, D2Vp, D2Vn, D2Wp, and D2Wn. The power converting operation is the same as that of inverter 30-1 described above and, therefore, detailed description will not be repeated.

Next, operations of inverters 30-1 and 30-2 and motor generators 34-1 and 34-2 at the time of charging main batteries MB1 and MB2 by the commercial power supply will be described. Inverters 30-1 and 30-2 correspond to the "power converting unit" of the present invention.

When main batteries MB1 and MB2 are charged by the commercial power supply, inverters 30-1 and 30-2 operate in a "zero-voltage mode", different from the normal switching operation described above. In the "zero-voltage mode," three transistors are collectively switched (turned on or off) in each of the upper side arm and lower side arm. In this operation mode, three switching elements on the upper arm side all assume the same switching state (all on or all off), and three transistors on the lower arm side all assume the same switching state.

Figure 4:
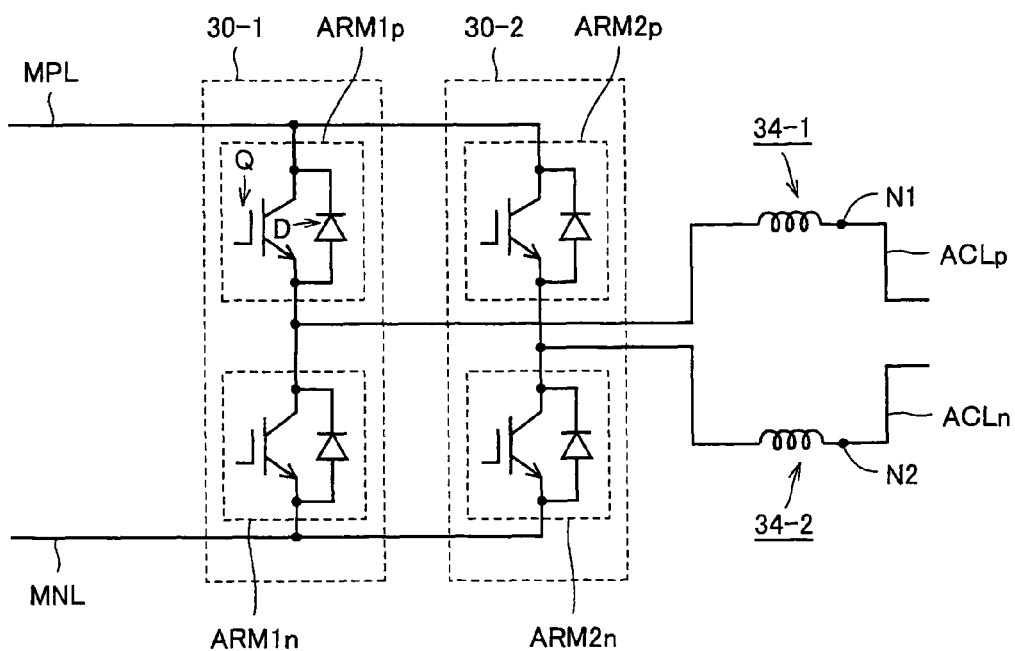
FIG. 4 is a zero-phase equivalent circuit diagram of the inverter and motor generator in the zero-voltage mode.

FIG. 4 shows a zero-phase equivalent circuit of inverters 30-1 and 30-2 and motor generators 34-1 and 34-2. Referring to FIG. 4, when inverters 30-1 and 30-2 operate in the zero-voltage mode as described above, the three transistors Q1Up, Q1Vp and Q1Wp and diodes D1Up, D1Vp and D1Wp on the upper arm side of inverter 30-1 are collectively represented as an upper arm ARM1p, and three transistors Q1Un, Q1Vn and Q1Wn and diodes D1Un, D1Vn and D1Wn on the lower arm side of inverter 30-1 are collectively represented as a lower arm ARM1n. Similarly, the three transistors and the diodes on the upper arm side of inverter 30-2 are collectively represented as an upper arm ARM2p, and the three transistors and the diodes on the lower arm side of inverter 30-2 are collectively represented as a lower arm ARM2n.

Specifically, each of the arms ARM1p, ARM1n, ARM2p, and ARM2n includes a transistor Q collectively representing three transistors and a diode D collectively representing three diodes. Therefore, the zero-phase equivalent circuit can be regarded as a single-phase inverter capable of converting the DC power supplied through main positive line MPL and main negative line MNL to a single-phase AC power and capable of converting single-phase AC power input to neutral points N1 and N2 through positive supply line ACLp and negative supply line ACLn to DC power.

Therefore, by controlling switching commands PWM1 and PWM 2 in a coordinated manner to have inverters 30-1 and 30-2 operate as the single-phase inverter, it becomes possible to convert single-phase AC power supplied from the commercial power supply to DC power and to supply the power to main positive line MPL and main negative line MNL. Main batteries MB1 and MB2 can be charged by the DC power.

When main batteries MB1 and MB2 are charged by the commercial power supply, switching commands PWC1 and PWC2 to be applied to converters 8-1 and 8-2 are also controlled such that appropriate charging current and charging voltage are supplied in accordance with the state of charge (SOC) of main batteries MB1 and MB2.

As described above, when charging of main batteries MB1 and MB2 by the commercial power supply is to be implemented, operation of controller 2 is indispensable. Therefore, even when connector unit 200 is coupled to vehicle 100, main batteries MB1 and MB2 cannot be charged if controller 2 is inoperable.

Again referring to FIG. 2, controller 2 is formed to operate with the low voltage power from sub battery SB. The low voltage power charging sub battery SB is generated by lowering the power of main battery MB1 at DC-DC converter 10. Therefore, if sub battery SB is in the over-discharged state, controller 2 cannot generate the switching command SWP and DC-DC converter 10 cannot execute the power converting operation. Therefore, the inoperable state of controller 2 continues, and main batteries MB1 and MB2 cannot be charged.

Particularly, in the present embodiment, the voltage value of commercial power supply as an example of external power supply is 100 V (or 200 V) and, therefore, in order to charge main batteries designed to have 300V to 500V, it is necessary to boost the voltage using inverters 30-1 and 30-2. In other words, main batteries MB1 and M2 cannot be charged by simply rectifying the commercial power supply.

In contrast, sub battery SB is designed to have the voltage value of 12V or 24V, which is relatively lower than the voltage value of commercial power supply. Therefore, the DC power for charging sub battery SB can be obtained relatively easily, by lowering the commercial power supply.

Therefore, vehicle 100 in accordance with the present embodiment includes a mechanism for charging sub battery SB independent of the state of operation of controller 2, when connector unit 200 is coupled to vehicle 100. In the embodiments described in the present specification, "independent of the state of operation" of controller 2 means "no matter whether the control operation by controller 2 is being executed or suspended" or, in other words, "even if controller 2 is kept in the inoperable state." In still another expression, it means that the configuration can charge sub battery SB "in an autonomous manner, not dependent on a control command such as a switching command, from controller 2."

Specifically, vehicle 100 in accordance with Embodiment 1 of the present invention has a low voltage power generating unit 4 that passively generates low voltage power, when electrically connected to the commercial power supply by the coupling of connector unit 200.

Low voltage power generating unit 4 is electrically connected to positive supply line ACLp and negative supply line ACLn, and receives power from the commercial power supply input through connector unit 200 and connector receiving portion 40 to vehicle 100, and thereby generates low voltage power.

More specifically, low voltage power generating unit 4 includes a winding transformer 12 and a diode unit 14. Winding transformer 12 is a voltage converting device that transforms commercial power supply input to a primary side at a prescribed ratio of transformation (turn ratio) and outputs the result to the secondary side. The transforming operation of winding transformer 12 naturally occurs when AC power is input, and it does not require any external control signal. Therefore, the transforming operation of winding transformer 12 is passive and spontaneous.

The voltage-lowered AC power output from the secondary side of winding transformer 12 is rectified by diode unit 14, whereby the low voltage power is generated. By way of example, diode unit 14 is a full-wave rectifying bridge circuit including four diodes, and when a voltage is simply applied to diode unit 14, the low voltage power is output. The low voltage power generated by diode unit 14 is supplied through a supplementary low voltage DC line SDCL to sub battery SB and controller 2.

The ratio of transformation of winding transformer 12 is set to a value appropriate for generating the low voltage power (for example, 12V) in accordance with the voltage value (for example, 100V or 200V) of the commercial power supply input to the primary side and the circuit configuration of diode unit 14 (full-wave rectification or half-wave rectification).

As described above, when connector unit 200 is coupled to vehicle 100 (connector receiving portion 40), low voltage power generating unit 4 charges sub battery SB without requiring any control command from controller 2. Therefore, even if sub battery SB is in the over-discharged state and controller 2 is inoperable when connector unit 200 is coupled to vehicle 100, controller 2 can reliably be operated by supplying the low voltage power and, hence, main batteries MB1 and MB2 can be charged by the commercial power supply.

According to Embodiment 1 of the present invention, when connector 200 is coupled to vehicle 100 to charge main batteries MB1 and MB2 mounted on vehicle 100, controller 2 can be operated by the low voltage power that is supplied from low voltage power supplying unit 4 independent of the state of operation of controller 2. Therefore, controller 2 can control the voltage converting operations of inverters 30-1 and 30-2 and converters 8-1 and 8-2 regardless of the state of charge of sub battery SB, and as a result, main batteries MB1 and MB2 can reliably be charged.

[Embodiment 2]

In Embodiment 1 above, a configuration has been described in which low voltage power generating unit 4 for passively generating low voltage power is mounted on the side of vehicle 100. In Embodiment 2, a configuration will be described in which the low voltage power generating unit 4 is provided on the side of vehicle charge device.

Figure 5:
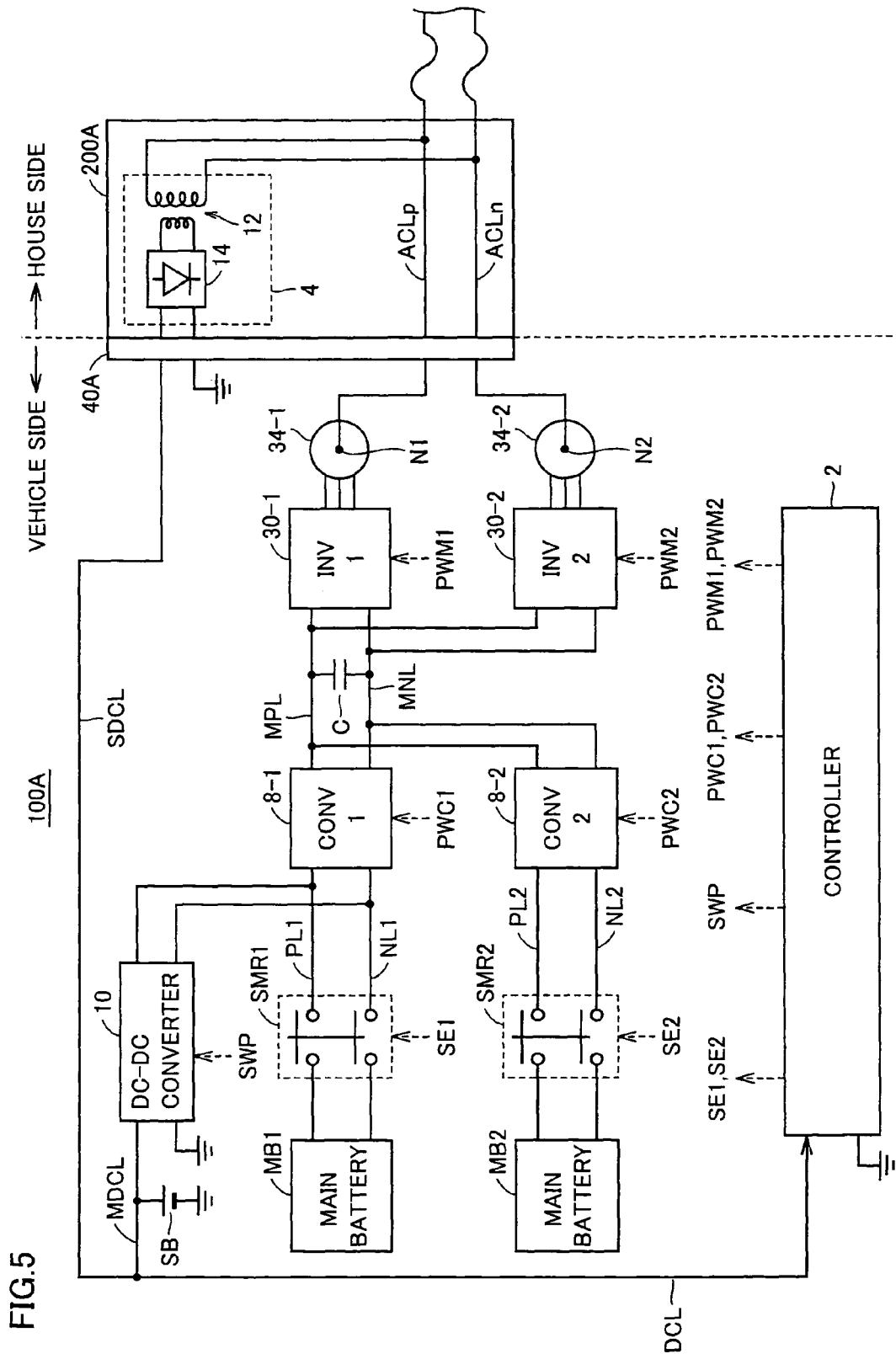
FIG. 5 is a schematic diagram showing a substantial portion of the vehicle charge system in accordance with Embodiment 2 of the present invention.

Referring to FIG. 5, a vehicle 100A constituting the vehicle charge system in accordance with Embodiment 2 of the present invention corresponds to vehicle 100 shown in FIG. 2, not including low voltage power generating unit 4 and having, in place of connector receiving portion 40, a connector receiving portion 40A that can receive the low voltage power generated by the vehicle charge device, in addition to the commercial power supply. Further, a connector unit 200A constituting the vehicle charge device in accordance with Embodiment 2 corresponds to connector unit 200 shown in FIG. 2, having low voltage power generating unit 4 provided therein. Except for these points, the system is the same as that shown in FIG. 2 and, therefore, detailed description thereof will not be repeated.

Connector unit 200A includes low voltage power generating unit 4 as described above, and generates low voltage power when it receives the power from commercial power supplied through power line ACL (positive supply line ACLp and negative supply line ACLn).

To each of contact surfaces of connector unit 200A and connector receiving portion 40A, a conductive contact portion is provided for transmitting the commercial power supply and the low voltage power, and when connector unit 200A is coupled to connector receiving portion 40A, these contact portions are electrically connected to each other. Consequently, a first path, through which the commercial power supply fed through power line ACL (positive supply line ACLp and negative supply line ACLn) is supplied to neutral points N1 and N2 of motor generators 34-1 and 34-2, and a second path, through which the low voltage power generated at connector unit 200A is supplied though supplementary low voltage DC line SDCL to sub battery SB and controller 2, are formed.

In this manner, when connector unit 200A is coupled to vehicle 100A (connector receiving portion 40A), low voltage generating unit 4 can charge sub battery SB without requiring any control command. Therefore, even if sub battery SB is in the over-discharged state and controller 2 is inoperable when connector unit 200A is coupled to vehicle 100A, controller 2 can reliably be operated by supplying the low voltage power and, hence, main batteries MB1 and MB2 can be charged by the commercial power supply.

According to Embodiment 2 of the present invention, when connector 200A is coupled to vehicle 100A to charge main batteries MB1 and MB2 mounted on vehicle 100A, controller 2 can be operated by the low voltage power that is supplied from low voltage power supplying unit 4 provided in connector unit 200A independent of the state of operation of controller 2. Therefore, controller 2 can control the voltage converting operations of inverters 30-1 and 30-2 and converters 8-1 and 8-2 regardless of the state of charge of sub battery SB, and as a result, main batteries MB1 and MB2 can reliably be charged.

[Embodiment 3]

In Embodiment 1 above, a configuration has been described in which low voltage power generating unit 4 mounted on the side of vehicle 100 passively generates low voltage power. In Embodiment 3, a configuration will be described in which the low voltage power is generated by lowering the output voltage of the main battery.

Figure 6:
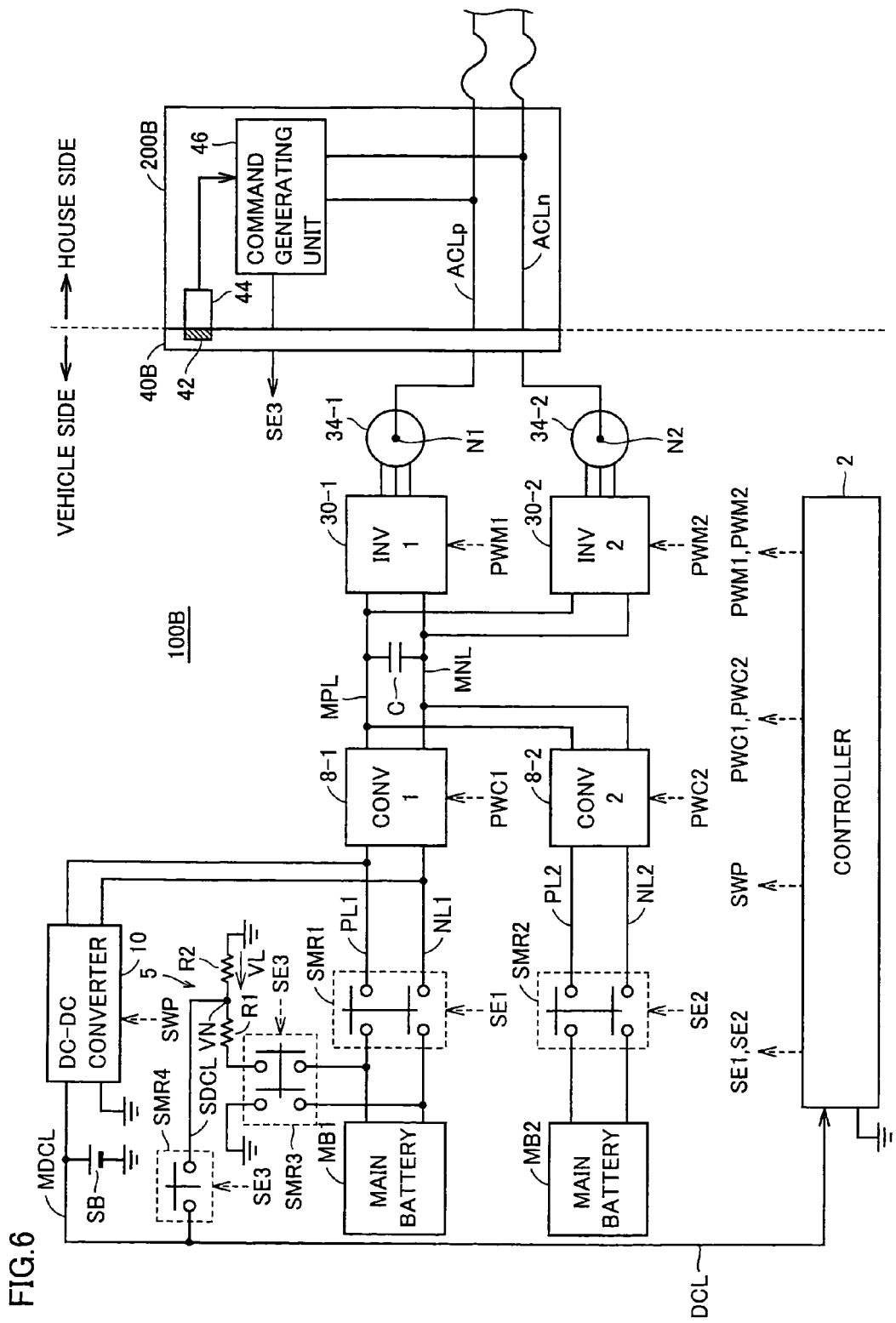
FIG. 6 is a schematic diagram showing a substantial portion of the vehicle charge system in accordance with Embodiment 3 of the present invention.

Referring to FIG. 6, vehicle 100B in accordance with Embodiment 3 of the present invention corresponds to vehicle 100 shown in FIG. 2, additionally. including a voltage lowering unit 5, system relays SMR3 and SMR4, and a connector receiving unit 40B with an identification tag 42. Further, connector unit 200B in accordance with Embodiment 3 of the present invention corresponds to connector unit 200 in accordance with Embodiment 1 of the present invention, additionally including a detecting unit 44 for detecting the identification tag 42 and a command generating unit 46 for generating a system enable signal SE3 for driving system relays SRM3 and SRM4 of vehicle 100B. Except for these points, the system is the same as the vehicle charge system shown in FIG. 2 and, therefore, detailed description will not be repeated.

Voltage lowering unit 5 of vehicle 100 is electrically connected to the output side of main battery MB1, and it passively generates low voltage power by lowering the output voltage of main battery MB1, and supplies the generated low voltage power to sub battery SB and to controller 2 through supplementary low voltage DC line SDCL.

Specifically, voltage lowering unit 5 is electrically connected to positive line PL1 and negative line NL1 between main battery MB1 and system relay SRM1. Therefore, regardless of the state of system relay SRM 1, the output voltage of main battery MB1 is supplied to voltage lowering unit 5. Further, between main battery MB1 and voltage lowering unit 5, system relay SMR3 is disposed, for electrically connecting or disconnecting these to/from each other. As will be described later, system relay SMR3 is driven by system enable signal SE3 from command generating unit 46 provided at connector unit 200B, and electrically connects these to each other. Specifically, system enable signal SE3 corresponds to a drive command.

At voltage lowering unit 5, a certain potential supplied from positive line PL1 (positive electrode potential of main battery MB1) is connected through series-connected voltage dividing resistances R1 and R2 to the vehicle body ground. Further, potential supplied from positive line PL1 (positive electrode potential of main battery MB1) is directly connected to the vehicle body ground. Therefore, a voltage VL appearing at a connection node VN between voltage dividing resistances R1 and R2, with the vehicle body ground being a reference, corresponds to the output voltage of main battery MB1 divided by the ratio of voltage dividing resistances R1 and R2. Specifically, there is a relation of voltage VL=output voltage of main battery MB1×R2/(R1+R2). As DC power is supplied from main battery MB1, value of voltage dividing resistances R1 and R2 are appropriately selected such that voltage VL comes to have a value corresponding to the low voltage (for example, 12V).

The low voltage power generated at voltage lowering unit 5 is supplied through supplementary low voltage DC line SDCL to sub battery SB and controller 2. A system relay SMR4 is inserted to supplementary low voltage DC line SDCL, in order to prevent reverse flow of current from sub battery SB to vehicle body ground when charging is not performed. Similar to system relay SMR3, system relay SMR4 is driven by system enable signal SE3. Therefore, voltage lowering unit 5 is electrically connected to sub battery SB and controller 2 only in the period when system enable signal SE3 is issued, that is, in the period when connector unit 200B is coupled to vehicle 100 and charging takes place.

At connector unit 200B, detecting unit 44 monitors coupling between connector unit 200B and connector receiving portion 40B, and when coupling is detected, a signal notifying coupling is sent to command generating unit 46. As to the method how detecting unit 44 monitors coupling between connector unit 200B and connector receiving portion 44B, any known method may be used. For instance, an identification tag 42 storing information unique to vehicle 100 may be provided on connector receiving portion 40B, detecting unit 44 periodically executes a process of electrically reading (for example, by using radio wave) the contents of identification tag 42, and based on the resultant reading, coupling between connector unit 200B and connector receiving portion 40B is determined.

In response to the coupling notifying signal from detecting unit 44, command generating unit 46 generates system enable signal SE3. Connector receiving portion 40B receives system enable signal SE3 generated by the vehicle charge device to vehicle 100B, in addition to the commercial power supply. In vehicle 100B, system enable signal SE3 received through connector receiving portion 40B is transmitted to system relays SMR3 and SMR4.

Here, command generating unit 46 is connected to positive supply line ACLp and negative supply line ACLn in parallel with motor generators 34-1 and 34-2, and operates receiving the power from commercial power supply. Therefore, it can output the system enable signal SE3 regardless of the state of operation of vehicle 100. Further, command generating unit 46 generates the system enable signal SE3 receiving the power from commercial power supply and, therefore, sufficient power to electrically drive system relays SMR3 and SMR4 can be supplied as the system enable signal SE3.

As described above, the command generating unit 46 of connector unit 200B applies system enable signal SE3 to vehicle 100B from the outside of vehicle 100B in response to coupling of connector unit 200B and vehicle 100B (connector receiving portion 40B), and drives system relays SMR3 and SMR4 mounted on vehicle 100B. Therefore, sub battery SB can be charged without generating any control command inside the vehicle 100B. Therefore, even if sub battery SB is in the over-discharged state and controller 2 is inoperable when connector unit 200B is coupled to vehicle 100B, controller 2 can reliably be operated by supplying the low voltage power and, hence, main batteries MB1 and MB2 can be charged by the commercial power supply.

According to Embodiment 3 of the present invention, when connector 200B is coupled to vehicle 100B to charge main batteries MB1 and MB2 mounted on vehicle 100B, voltage lowering unit 5 lowers the output voltage of main battery MB1 and supplies the low voltage power, independent of the state of operation of controller 2. Therefore, the voltage converting operations of inverters 30-1 and 30-2 and converters 8-1 and 8-2 controlled by controller 2 can be maintained, and main batteries MB1 and MB2 can reliably be charged.

In Embodiments 1 to 3 above, configurations in which an external power supply (single-phase AC) input to the neutral points of two motor generators is converted to DC power using two inverters for charging the main batteries have been described as examples. The configurations, however, are not limiting. The present invention is similarly applicable to a configuration that requires operation of a controller when the main battery is to be charged by an external power supply. By way of example, the present invention is applicable to a vehicle including a separate power converting device (such as an inverter) having a rectifying function of converting AC power having the voltage value of 100V (or 200V) supplied from the commercial power supply to DC power and a DC boosting function of boosting to a voltage value exceeding the rated voltage value of main battery, set higher than the voltage value of rectified DC power.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An electric powered vehicle, mounting a rechargeable first power storage unit and allowing charging of said first power storage unit by an external power supply, comprising:
    a connector receiving portion coupled at the time of charging to a connector unit outside of the vehicle, for receiving electric power from said external power supply;
    a power converting unit for converting the electric power from said external power supply, supplied by the coupling of said connector unit and said connector receiving portion and for charging said first power storage unit;
    a rechargeable second power storage unit having lower output voltage than said first power storage unit;

a control unit operating with electric power from said second power storage unit and for controlling power converting operation of said power converting unit; and
a low voltage charging unit for charging said second power storage unit,
wherein the coupling of said connector unit and said connector receiving portion directly connects the external power source to the low voltage charging unit, which is directly connected to the second power storage unit and control unit, and
wherein the low voltage charging unit for charging the second power storage unit is independent of state of operation of the control unit, when the connector unit is coupled to the connector receiving portion.

2. The electric powered vehicle according to claim 1, wherein
said low voltage charging unit includes a low voltage power generating unit for receiving at least part of the electric power from said external power supply and passively generating low voltage power for charging said second power storage unit.

3. The electric powered vehicle according to claim 1, wherein
said connector receiving portion is adapted to receive low voltage power for charging said second power storage unit generated outside of said vehicle, in addition to the electric power from said external power supply; and
said low voltage charging unit includes a power line for charging said second power storage unit with said low voltage power received through said connector receiving portion.

4. The electric powered vehicle according to claim 1, wherein
said low voltage charging unit includes
a voltage lowering unit for lowering output voltage of said first power storage unit and passively generating low voltage power for charging said second power storage unit, and
a relay unit connected between said first power storage unit and said voltage lowering unit for electrically connecting/disconnecting these to/from each other; and
said relay unit electrically connects said first power storage unit to said voltage lowering unit in response to a drive command issued when said connector unit is coupled to said connector receiving portion.

5. A vehicle charge device, for an electric powered vehicle mounting a rechargeable first power storage unit, for charging said first power storage unit with an external power supply, wherein
said electric powered vehicle comprises:
a power converting unit for converting electric power supplied from said external power supply at the time of charging, and for charging said first power storage unit,
a rechargeable second power storage unit having lower output voltage than said first power storage unit, and
a control unit operating with electric power from said second power storage unit and for controlling power converting operation of said power converting unit; and
said vehicle charge device includes
a connector unit coupled at the time of charging to said electric powered vehicle, for electrically connecting said external power supply and said electric powered vehicle, and
a low voltage charging unit for charging said second power storage unit,
wherein the coupling of said connector unit and said electric powered vehicle directly connects the external power source to the low voltage charging unit, which is directly connected to the second power storage unit and control unit, and
wherein the low voltage charging unit for charging the second power storage unit is independent of state of operation of the control unit, when the connector unit is coupled to the electric powered vehicle.

6. The vehicle charge device according to claim 5, wherein
said low voltage charging unit includes a low voltage power generating unit for receiving the electric power from said external power supply and passively generating low voltage power for charging said second power storage unit;
said connector unit is adapted to supply said low voltage power to said electric powered vehicle in addition to the electric power from said external power supply; and
said electric powered vehicle includes a power line for charging said second power storage unit with said low voltage power supplied through said connector unit.

7. The vehicle charge device according to claim 5, wherein
said electric powered vehicle further includes
a voltage lowering unit for lowering output voltage of said first power storage unit and passively generating low voltage power for charging said second power storage unit, and
a relay unit connected between said first power storage unit and said voltage lowering unit for electrically connecting/disconnecting these to/from each other; and
said low voltage charging unit includes a command generating unit for applying, to said switching unit of said electric powered vehicle, a drive command causing said relay unit to electrically connect said first power storage unit to said voltage lowering unit, in response to coupling of said connector unit and said electric powered vehicle.

8. A vehicle charge system, comprising:
an electric powered vehicle mounting a rechargeable first power storage unit; and
a vehicle charge device for charging said first power storage unit mounted on said electric powered vehicle by an external power supply; wherein
said vehicle charge device includes a connector unit coupled at the time of charging to said electric powered vehicle, for electrically connecting said external power supply and said electric powered vehicle;
said electric powered vehicle includes
a power converting unit for converting electric power supplied from said external power supply at the time of charging, and for charging said first power storage unit,
a rechargeable second power storage unit having lower output voltage than said first power storage unit, and
a control unit operating with electric power from said second power storage unit and for controlling power converting operation of said power converting unit;
said vehicle charge system further comprising
a low voltage charging unit for charging said second power storage unit,
wherein the coupling of said connector unit and said electric powered vehicle directly connects the external power source to the low voltage charging unit, which is directly connected to the second power storage unit and control unit, and
wherein the low voltage charging unit for charging the second power storage unit is independent of state of operation of the control unit, when the connector unit is coupled to the electric powered vehicle.

9. The vehicle charge system according to claim 8, wherein
said low voltage charging unit includes a low voltage power generating unit for receiving the electric power from said external power supply and passively generating low voltage power for charging said second power storage unit.

10. The vehicle charge system according to claim 9, wherein
said low voltage power generating unit is mounted on said electric powered vehicle and adapted to receive at least part of the electric power from said external power supply, supplied to said electric powered vehicle by the coupling of said connector unit.

11. The vehicle charge system according to claim 9, wherein
said low voltage power generating unit is provided in said connector unit, receives at least part of the electric power from said external power supply to be supplied to said electric powered vehicle and generates said low voltage power, and adapted such that said low voltage power is supplied through said connector unit to said second power storage unit of said electric powered vehicle.

12. The vehicle charge system according to claim 8, wherein
said low voltage charging unit includes
a voltage lowering unit for lowering output voltage of said first power storage unit and passively generating low voltage power for charging said second power storage unit, and
a relay unit connected between said first power storage unit and said voltage lowering unit for electrically connecting/disconnecting these to/from each other; and
said relay unit electrically connects said first power storage unit and said voltage lowering unit when said connector unit is coupled to said electric powered vehicle.

13. The vehicle charge system according to claim 12, wherein
said low voltage charging unit further includes a command generating unit for generating a drive command causing said relay unit to electrically connect said first power storage unit to said voltage lowering unit, in response to coupling of said connector unit and said electric powered vehicle; and
said command generating unit is provided at said connector unit and operates receiving the electric power from said external power supply.

14. The electric powered vehicle according to claim 1, wherein
the low voltage charging unit powers the control unit.

15. The vehicle charge device according to claim 5, wherein
the low voltage charging unit powers the control unit.

16. The vehicle charge system according to claim 8, wherein
the low voltage charging unit powers the control unit.

* * * * *